US008930288B2

(12) United States Patent
Toderici et al.

(10) Patent No.: US 8,930,288 B2
(45) Date of Patent: Jan. 6, 2015

(54) LEARNING TAGS FOR VIDEO ANNOTATION USING LATENT SUBTAGS

(75) Inventors: George D. Toderici, Mountain View, CA (US); Weilong Yang, Burnaby (CA)

(73) Assignee: Google Inc., Mountain View, CA (US)

(*) Notice: Subject to any disclaimer, the term of this patent is extended or adjusted under 35 U.S.C. 154(b) by 474 days.

(21) Appl. No.: 13/294,483

(22) Filed: Nov. 11, 2011

(65) Prior Publication Data

US 2012/0123978 A1 May 17, 2012

Related U.S. Application Data

(60) Provisional application No. 61/412,787, filed on Nov. 11, 2010.

(51) Int. Cl.
```
G06F 15/18    (2006.01)
G06N 99/00    (2010.01)
G11B 27/10    (2006.01)
G11B 27/28    (2006.01)
G06K 9/00     (2006.01)
G06F 17/30    (2006.01)
```

(52) U.S. Cl.
CPC ............ *G06N 99/005* (2013.01); *G11B 27/105* (2013.01); *G11B 27/28* (2013.01); *G06K 9/00744* (2013.01); *G06F 17/30799* (2013.01); *G06F 17/3082* (2013.01)
USPC .......................................................... 706/12

(58) Field of Classification Search
CPC ...................... G06K 9/00711–9/00765; G06K 9/6267–9/6287; G06K 9/6217–9/6265; G06K 9/6288–9/6293; G06K 9/46–9/527; G06F 17/30784
See application file for complete search history.

(56) References Cited

U.S. PATENT DOCUMENTS

| | | | |
|---|---|---|---|
| 2005/0286772 A1* | 12/2005 | Albertelli | 382/224 |
| 2006/0120609 A1* | 6/2006 | Ivanov et al. | 382/224 |
| 2008/0228749 A1 | 9/2008 | Brown | |
| 2009/0164416 A1 | 6/2009 | Guha | |
| 2009/0313294 A1 | 12/2009 | Mei et al. | |
| 2010/0250473 A1* | 9/2010 | Porikli et al. | 706/12 |

FOREIGN PATENT DOCUMENTS

JP 2007-328675 A 12/2007

OTHER PUBLICATIONS

Hodge, Victoria J. et al.; "A Survey of Outlier Detection Methodologies"; 2004; Artificial Intelligence Review 22; pp. 85-126.*
Ulges, Adrain et al.; "A System That Learns to Tag Videos by Watching Youtube"; 2008; Springer-Verlag; pp. 415-424.*

(Continued)

*Primary Examiner* — Stanley K Hill
(74) *Attorney, Agent, or Firm* — Fenwick & West LLP

(57) ABSTRACT

A tag learning module trains video classifiers associated with a stored set of tags derived from textual metadata of a plurality of videos, the training based on features extracted from training videos. Each of the tag classifiers is comprised of a plurality of subtag classifiers relating to latent subtags within the tag. The latent subtags can be initialized by clustering cowatch information relating to the videos for a tag. After initialization to identify subtag groups, a subtag classifier can be trained on features extracted from each subtag group. Iterative training of the subtag classifiers can be accomplished by identifying the latent subtags of a training set using the subtag classifiers, then iteratively improving the subtag classifiers by training each subtag classifier with the videos designated as conforming closest to that subtag.

19 Claims, 5 Drawing Sheets

(56) References Cited

OTHER PUBLICATIONS

Ramachandran, Chandrasekar et al; "VideoMule: A Consensus Learning Approach to Multi-Label Classification from Noisy User-Generated Videos"; 2009; ACM; pp. 721-724.*

Toderici, George et al.; "Finding Meaning on YouTube: Tag Recommendation and Category Discovery"; 2010; IEEE; pp. 3447-3454.*

Wang, Yang et al.; A Discriminative Latent Model of Image Region and Object Tag Correspondence; 2010; pp. 1-9.*

Aradhye, Hrishikesh et al.; "VideoText: Learning to Annotate Video Content"; 2009; IEEE; International Conference on Data Mining Workshops; pp. 144-151.*

PCT International Search Report and Written Opinion, PCT/US2011/060219, Apr. 24, 2012, 7 Pages.

Anderson, R., A local algorithm for finding dense subgraphs, In Proc. 19th Annual ACM-SIAM Symposium on Discrete Algorithms, 2008, pp. 1003-1009.

Blum, A. et al., "Combining labeled and unlabeled data with co-training," In Proc. 11th Annual Conference on Computational Learning Theory, COLT, Jul. 1998, pp. 92-100.

Davison, B. D., "Topical locality in the web," In Proc. 23rd Annual International ACM SIGIR Conference on Research and Development in Information Retrieval, 2004, pp. 272-279.

Dekel, O., et al., "Large margin hierarchical classification," Proceedings of the 21 st International Conference on Machine Learning, Banff, Canada, 2004, 8 pages.

Deng, J., et al., "ImageNet: A Large-Scale Hierarchical Image Database," IEEE Computer Society Conference on Computer Vision and Pattern Recognition, Jun. 22, 2009, pp. 248-255.

Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.

Fan, R.-E., et al., "Liblinear: A library for large linear classification," Journal of Machine Learning Research, 2008, pp. 1871-1874, vol. 9.

Freund, Y., et al., "A decision-theoretic generalization of on-line learning and an application to Boosting," Journal of Computer and System Sciences, 1997, pp. 119-139, vol. 55, article No. SS971504.

Goldman, S., et al., "Enhancing supervised learning with unlabeled data," In Proc. $17^{th}$ International Conference on Machine Learning, 2000, pp. 327-334.

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD, 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Li, L.-J., et al., "Optimol: automatic object picture collection via incremental model learning," In Proc. IEEE Conf. Computer Vision and Pattern Recognition, 2007, 8 Pages.

Liu, T.-Y., et al., "Support vector machines classification with a very large-scale taxonomy," In SIGKDD Explorations, 2005, pp. 36-43, vol. 7, Issue 1.

Mahajan, D., et al., "Image classification using the web graph," In Proc. Multimedia, Oct. 25-29, 2010, pp. 991-994.

Neapolitan, R. E., et al., "Learning Bayesian Networks," Prentice-Hall, Inc., Upper Saddle River, NJ, USA, 2003, Cover page and Table of Contents, 7 Pages.

Niebles, J. C., et al., "Extracting moving people from internet videos," In ECCV '08: Proceedings of the 10th European Conference on Computer Vision, 2008, pp. 527-540, Part IV, LNCS 5305.

Schapire, R. E., "The boosting approach to machine learning: An overview," In MSRI Workshop on Non-linear Estimation and Classification, 2002, pp. 1-23.

Schindler, G., et al., Internet video category recognition. In Proc. First IEEE Workshop on Internet Vision, in CVPR, 2008, pp. 1-7.

Song, Y., et al., "Taxonomic classification for web-based videos," In Proc. IEEE Conf. Computer Vision and Pattern Recognition, Jun. 2010, pp. 871-878.

Sun, A., et al., "Hierarchical text classification and evaluation," In ICDM, 2001, pp. 521-528.

Tang, L., et al., "Large scale multi-label classification via metalabeler," In Proc. $18^{th}$ International Conference on World Wide Web, Apr. 20-24, 2009, pp. 211-220.

Wang, Z., et al., "Youtubecat: Learning to categorize wild web videos," In Proc. IEEE Conf. Computer Vision and Pattern Recognition, Jun. 2010, pp. 879-886.

Zanetti, S., et al., "A walk through the web's video clips," In Proc. First IEEE Workshop on Internet Vision, in CVPR, 2008, 8 pages.

Zhu, X., Semi-supervised learning literature survey. In Tech Report. University of Wisconsin—Madison, Jul. 2008, pp. 1-60.

* cited by examiner

LEARNING TAGS FOR VIDEO ANNOTATION USING LATENT SUBTAGS

CROSS REFERENCE TO RELATED APPLICATIONS

The application claims the benefit of U.S. Provisional Application No. 61/412,787, filed on Nov. 11, 2010, which is hereby incorporated by reference.

BACKGROUND

1. Field of Art

The present disclosure generally relates to the field of tag identification, and more specifically, to methods automatically identifying objects with tags that they represent.

2. Background

Providers of digital videos typically label their videos with one or more keywords or "tags" that describe the contents of the video or a portion thereof, such as "bike" or "transformers." Most video hosting systems rely on users to tags their videos, but such user provided tags can be very inaccurate. While there are methods to automatically determine tags for a video, existing automatic tag labeling approaches depend on videos having semantically unambiguous video tags. That is, conventional methods typically require that the classifiers are trained with only videos where the tag refers to a single type of video with similar extracted features. However, large corpuses of user-contributed videos can represent a very large and diverse number of distinct types of videos among a single tag. For example, a tag for "bike" can be applied to videos relating to mountain biking, pocket bikes, falling off a bike, and other semantically different types of videos. Typical machine learning based on a single classifier for the "bike" tag will often fail to identify the different features associated with the distinct types of videos among a single tag.

SUMMARY

A tag learning module trains video classifiers associated with a stored set of tags derived from textual metadata of a plurality of videos, the training based on features extracted from training videos. Each of the tag classifiers can comprise a plurality of subtag classifiers. Each of the latent subtag classifiers is trained on videos associated with a training set for that subtag classifier. The videos automatically identified with a latent subtag by features extracted from the videos, and need not represent semantically meaningful divisions within the tag. Thus, the tag learning module can create tag classifiers that more accurately and automatically label videos based on the features associated not just with the tag itself, but with latent subtags thereof.

In one embodiment, an initial training set of videos for a given tag are grouped into subtag categories by identifying cowatch information relating to the set videos. The cowatch information is used to determine which of the initial training set of videos are watched with other videos in the initial training set. Cowatch information broadly includes data generally indicating user tendencies to watch two different videos together, such a user watching the videos within a viewing session or within a certain period of time from one another. Cowatch information is further defined below.

After determining the videos that are viewed together, the initial training set of videos can be clustered to determine an initial grouping of latent subtags. The initial latent subtag classifiers are then be trained on the videos in each subtag cluster. In this manner, each of the subtag classifiers learns the features associated with videos associated with the latent subtags.

In one embodiment, the subtag classifiers are iteratively trained on a training set. First, the subtag classifiers can be used to identify each of the videos in the training set as belonging to a particular subtag. Next, each subtag classifier can be retrained on the videos identified as belonging to that subtag. In an embodiment, prior to retraining, the videos in the subtag training sets are bootstrapped to exclude positive training set videos that receive low confidence scores by the subtag classifier and negative training set videos that also receive low confidence scores by the subtag classifier.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture

Figure 1:
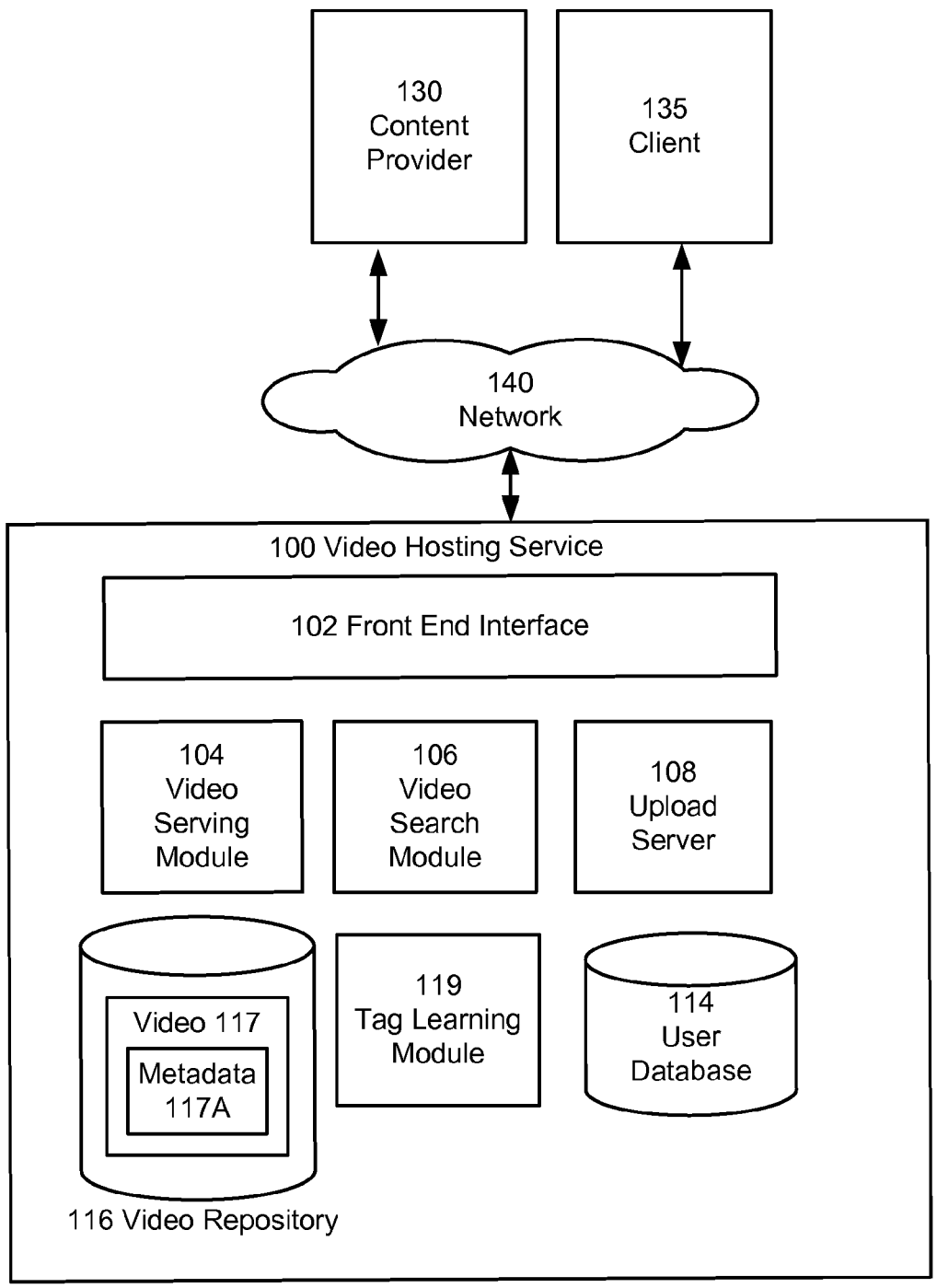
FIG. 1 is a block diagram of a video hosting service in which tag learning can be employed according to an embodiment.

FIG. 1 is a block diagram of a video hosting service 100 in which tag learning with latent subtags can be employed, according to one embodiment. The video hosting service 100 represents a system such as that of YOUTUBE or GOOGLE VIDEO that stores and provides videos to clients such as the client device 135. The video hosting site 100 communicates with a plurality of content providers 130 and client devices 135 via a network 140 to facilitate sharing of video content between users. Note that in FIG. 1, for the sake of clarity only one instance of content provider 130 and client 135 is shown, though there could be any number of each. The video hosting service 100 additionally includes a front end interface 102, a video serving module 104, a video search module 106, an upload server 108, a user database 114, and a video repository 116. Other conventional features, such as firewalls, load balancers, authentication servers, application servers, failover servers, site management tools, and so forth are not shown so as to more clearly illustrate the features of the video hosting site 100. One example of a suitable site 100 is the YOUTUBE website, found at www.youtube.com. Other video hosting sites can be adapted to operate according to the teachings disclosed herein. The illustrated components of the video hosting website 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting website 100 can also be performed by one or more clients 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, or a laptop computer.

The network 140 is typically the Internet, but may be any network, including but not limited to a LAN, a MAN, a WAN, a mobile wired or wireless network, a private network, or a virtual private network. Client device 135 may comprise a personal computer or other network-capable device such as a personal digital assistant (PDA), a mobile telephone, a pager, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting site 100.

The content provider 130 operates a client device to perform various content provider functions. Content provider functions may include, for example, uploading a video file to the video hosting website 100, editing a video file stored by the video hosting website 100, or editing content provider preferences associated with a video file.

The client 135 operates on a device to view video content stored by the video hosting site 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting website 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video hosting service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video hosting site 100.

In some embodiments, the user database 114 is responsible for maintaining a record of all registered users of the video hosting server 100. Registered users include content providers 130 and/or users who simply view videos on the video hosting website 100. Each content provider 130 and/or individual user registers account information including login name, electronic mail (e-mail) address and password with the video hosting server 100, and is provided with a unique user ID. This account information is stored in the user database 114.

The video repository 116 contains a set of videos 117 submitted by users. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, WebM, WMV, H.263, and the like. In addition to their audiovisual content, the videos 117 further have associated metadata 117A, e.g., textual metadata such as a title, description, and/or tags.

The video hosting service 100 further comprises a tag learning module 119 that trains accurate video classifiers for a set of tags. The trained classifiers can then be applied to a given video to automatically determine which of the tags may apply to the video. For example, a user may submit a new video, and the tag learning module 119 can automatically recommend a tag or group of tags to be applied to the video. The tag learning module can also be used to verify a tag entered by a user before adopting the tag as associated with the video as part of the video's metadata 117A. The tag learning module 119 is now described in greater detail.

Tag Learning Module

Figure 2:
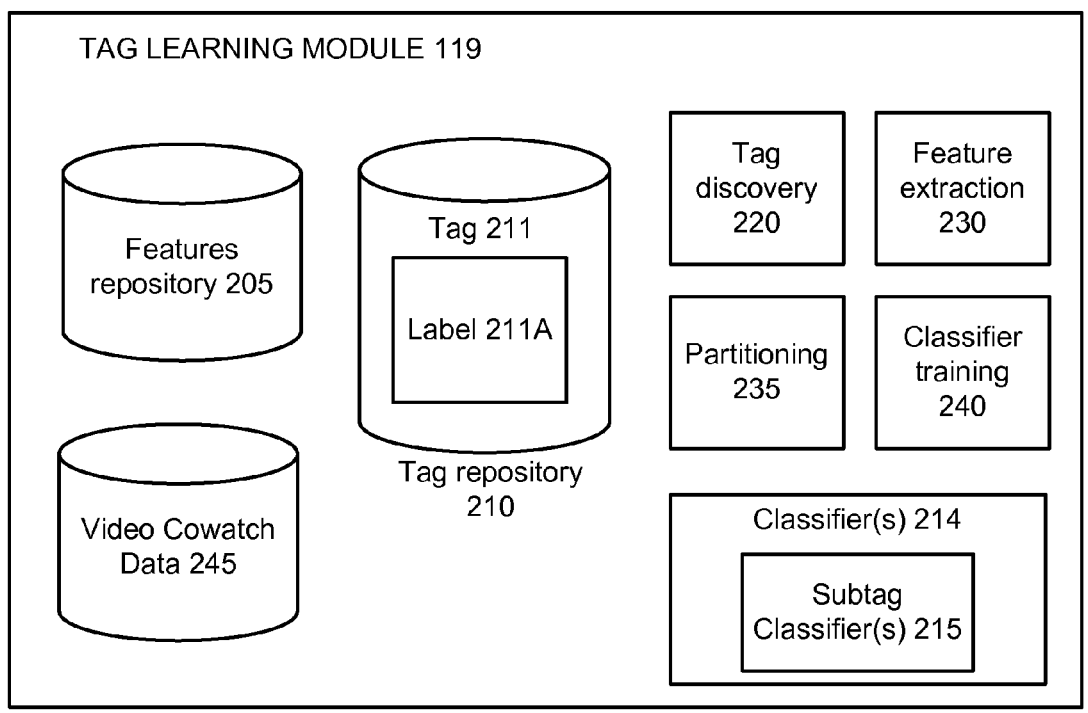
FIG. 2 illustrates the various components of a tag learning module used in the video hosting service according to an embodiment.

FIG. 2 illustrates the various components of the tag learning module 119, according to one embodiment. The tag learning module 119 comprises various modules to discover tags, to derive video features, to train classifiers for various tags, and the like. In one embodiment, the tag learning module 119 is incorporated into an existing video hosting service 100, such as YOUTUBE.

The tag learning module 119 has access to the video repository 116 of the video hosting service 100. The tag learning module 119 additionally comprises a features repository 205 that stores, for videos of the video repository 116, associated sets of features that characterize the videos with respect to one or more types of visual or audio information, such as color, movement, and audio information. The features of a video 117 are distinct from the raw content of the video itself and are derived from it by a feature extraction module 230. In one embodiment, the features are stored as a vector of values, the vector having the same dimensions for each of the videos 117 for purposes of consistency.

The tag learning module 119 further comprises a tag repository 210 that stores the various tags 211 for which classifiers may be learned. Generally, a tag is a term or phrase that describes some entity, activity, event, place, object, or characteristic that is associated with a video 117. A tag is typically used as a keyword associated with a video to help organize, browse and search for videos within a video collection. Tags can be associated with a video as a portion of the metadata 117A and typically may be stored along with the description, comments, annotations, and other data associated with the video. Each tag has both a label 211A, which is a unique name for the tag, such as "bike," "boat," "card," "dog," "explosion," "flower," "helicopter," and other descriptors. The tags 211A can be associated with various statistics, such as frequency of occurrence, the tag's frequency of co-occurrence with other tags (i.e. the rate a tag appears with a second tag), and the like.

Because users do not necessarily label videos with great accuracy, a given tag may be applied a variety of videos with varying feature types. These various videos for the tags can be divided into a number of different subsets, based on cowatch or other metrics. Each different subset or group can be said to be associated with a different latent subtag of the tag. A given subtag is thus associated with particular features extracted from its respective subset of videos, but may or may not correspond to a semantically meaningful label or have particular taxonomical relationship with a tag. Therefore, while a tag may include a particular label, such as "bike," the subtags thereof can include labels such as "mountain bike" or "motocross", as well as subtags that do not have particular name or meaning, but simply stand as identifiers (e.g. subtag 1, subtag 2, etc.) or proxies for a set of features extracted from a particular subset of videos of the "bike" tag that have strong co-watch or other relationships with each other. Though a semantic meaning may or may not be derived from the subtags, a video associated with a subtag implies that the video is associated with the tag for that subtag.

The tag learning module 119 thus has a number of classifiers 214, each of which is associated with one of the tags 211. The classifier 214 for a tag 211 is a function that outputs a score representing a degree to which the features associated with the video indicate that the particular tag 211 is relevant to the video, thus serving as a measure indicating whether the tag 211 can be accurately applied to label the video. The classifier 214 for a tag 211 is based upon a plurality of subtag classifiers 215 relating to subtags of the tag. In one embodiment, the features to which the classifier 214 is applied include both video content features (described below with respect to feature extraction module 230) and cowatch features derived from video cowatch data. In practice, cowatch features may be most useful in classifying videos presently in the video repository or in determining subtag membership, but less useful in identifying tags for new videos, as new videos to the video repository will either have no cowatch data or very minimal cowatch data.

In one embodiment, some tag classifiers 114 utilize subtag classifiers 115 in the tag classifier model, and some tag classifiers 114 do not use subtag classifiers 115. In other words, subtag classifiers 115 can be selectively used for the tag classifiers where there is a performance improvement in identifying tags. Conversely subtag classifiers 215 are not used where there is little or no improvement in tag classification relative to a single tag classifier. Subtag classifiers 215 therefore are implemented on a per-tag basis.

The classifier 214 can return different types of scores in different embodiments. For example, in one embodiment each classifier 214 outputs a real number indicating a strength of the relevance match between the video and the classifier (and hence the concept or topic represented by the corresponding tag 211). In another embodiment, the classifier 214 outputs a Boolean value, e.g., the integer 1 to indicate that the video is relevant to the tag, and a different value, e.g., the integer 0, to indicate that the tag is not relevant.

The classifier learning module 119 also comprises a tag discovery module 220 that identifies potential tags that can be used to label videos. In one embodiment, the tag discovery module 220 extracts the tags from the video metadata 117A of the various videos 117 in the video repository 116, or from some subset of the metadata, such as the title and user-suggested tags or the description. For example, the tag discovery module 220 can determine the set of all individual (uni-gram) or paired (bi-gram) tags applied to videos in the repository, and then identify the N (e.g., 10,000) most frequent unigrams and bigrams, as potential tags for the repository 210. The tag discovery module 220 removes a set of predetermined "stop-words" unlikely to convey substantive meaning, such as articles and prepositions like "a," "the," and "of," from the list of potential tags.

In an alternate embodiment, the tag discovery module 220 obtains the set of potential tags from another source, such as a pre-existing set of terms and phrases such as provided by WordNet, rather than extracting them from video metadata 117A.

For each potential tag, the tag discovery module 220 maintains statistics such as frequency of occurrence of the tag within the video metadata in one embodiment. The tag discovery module 220 purges identified potential tags that occur too frequently or infrequently in the video metadata 117A, for some predetermined thresholds of frequency, such as a maximum threshold of 100,000 videos, and a minimum threshold of 1,500 videos. For example, the tags "video" or "funny" are generic and so are likely to occur an extremely large number of times for very different genres of videos. Thus, they would be unlikely to represent a single, distinct type of video and would therefore be purged. Similarly, tags occurring a very small number of times would not provide enough data to allow learning algorithms to train a useful classifier for the tag and would likewise be purged.

Feature Extraction

The video hosting service 100 additionally comprises a feature extraction module 230 that derives features used to compactly characterize a video for purposes of machine learning. In one embodiment, the feature extraction module 230 derives a number of different audiovisual features 205 from the content of the video 117, including features relating to frame features, motion features, and auditory features. In other embodiments, other features or other feature types may be extracted to analyze the video corpus. Specifically, each type of feature can use a bag-of-word representation. Further, each feature can be represented as a histogram by vector quantizing the feature descriptors and may further be normalized so that the sum of the bin values is 1. In an embodiment, the feature vector of each video is a concatenation of the histograms for each feature. A wide variety of features extracted from the videos could be useful in a variety of embodiments according to a designer's preference and the discriminative ability of each feature set relative to tag differentiation.

In one embodiment, the frame features for videos include histograms of oriented gradients (HOG), color histograms, textons, and a face counter. To calculate the HOG feature, at each frame pixel location, a 1800-dimensional feature descriptor is extracted as a concatenation of HOG in a 10×10 surrounding window. The raw descriptors are then collected into a bag-of-words representation by quantizing the raw descriptors using a randomized decision tree. The color histogram can be a Hue-Saturation histogram. The face counter may be used to easily discriminate videos that contain human faces and the number of human faces in a video. Motion features can be calculated using a cuboid interest point detector to extract spatio-temporal volumes around detected interest points. From the cuboids, two descriptors can be extracted. First, the normalized pixel values can be concatenated to a vector and PCA can be applied on the vector to reduce the dimensionality to, for example, 256. Second, each slice of the cuboid can be split into 2×2 cells. Then, the HOG descriptors of the cells in the cuboid can be concatenated into a vector. The dimensionality of the HOG descriptor vector can also be reduced using PCA to, for example, 256. In addition to, or as an alternative to HOG, other features may be used, including but not limited to motion rigidity features, filter responses (e.g., derived from Gabor wavelets), including 3D filter responses, edge features using edges detected by a Canny edge detector, GLOH (Gradient Location and Orientation Histogram), LESH (Local Energy based Shape Histogram), or SURF (Speeded Up Robust Features) features.

The descriptors can be further quantized using the corresponding codebooks. Audio features can include a vector forming a Stabilized Auditory Image (SAI) and Mel-Frequency Cepstral Coefficients (MFCC).

In one embodiment, the same set of feature types—e.g., frame, motion, and audio—is extracted for every video. However, different types of features can be useful for learning different types of videos. For example, the audio features are effective for learning to recognize certain types of videos primarily characterized by their music but are of little use in distinguishing videos based on their visual motion, such as distinguishing cartoon videos from other types of videos. Accordingly, the particular types of features employed may vary in different embodiments, depending on the particular labeling application being used. That is, an embodiment can employ any type of feature that usefully describes properties of videos by which one video can be distinguished from another. The extracted features 205 then serve as a representation of the associated video 117 from which they were extracted for purposes of subsequent learning operations. Prior to being used for training, the extracted features may be reduced in dimensionality using a linear SVM, PCA, or other methods to determine a subset of discriminative features. These discriminative features may then be used as the inputs for classifier training 240.

Video Set Partitioning

Partitioning module 235 partitions the videos 117 into different sets used for performing training of the classifiers 212. More specifically, the partitioning module 235 divides the videos 117 into distinct training and validation sets, where the training set T is used for training classifiers ("learning") for different tags and the validation set is used to test the accuracy of the trained/learned classifiers. In an embodiment in which the tag learning comprises several iterations, the partitioning module 235 can additionally subdivide the training and validation sets for each possible iteration.

Further, the partitioning module 235 can define, for every tag 211, a training set and validation set specifically for that tag. The partitioning module 235 also divides the videos of the per-tag training and validation sets into "positive" examples presumed to be representative of the associated tag and "negative" examples presumed not to be representative.

In one embodiment, the partitioning module 235 identifies a video as belonging to the positive set for a tag 211 if the tag 211 is located somewhere within its textual metadata, e.g., an existing tag (either user-assigned or previously defined by a classifier), the video's title, description, or list of keywords—and to the negative set otherwise. Thus, in this embodiment the positive and negative sets are defined with reference only to existing metadata, without the need for manual labeling by human experts. In one embodiment, the negative examples are selected randomly from the whole corpus. In short, for each tag 211 there are four sets of videos: a positive training set, a negative training set, a positive validation set, and a negative validation set.

Classifier Training

The tag learning module 119 additionally comprises a classifier training module 240 that iteratively learns classifiers 214 for the tags 211 based on the positive and negative training sets identified for a tag by the partitioning module 235. The classifiers 214 are trained though a number of training iterations. More specifically, at a given iteration the classifier training module 240 attempts to learn the classifier 214 for a given tag 211 by applying an ensemble learning algorithm to the derived features 205 of the videos 117 in the training set for the tag 211. In one embodiment, the ensemble learning algorithm employed is LogitBoost, with 256 decision stumps. Using LogitBoost, a strong classifier 214 can be generated using decision stumps as the weak learner. Other learning algorithms, such as AdaBoost or other boosting algorithms, as well as linear classifiers or support vector machines could likewise be used. For classifier training using latent subtags, a plurality of subtag classifiers 215 are trained for each subtag in an iterative fashion. The subtag classifiers 215 for a tag are then used as components of the tag classifier 214.

Initialization of Subtag Training Sets Using Cowatch Data

In order to begin classifying a tag using latent subtags, the training set S is initialized for each subtag a, b, c, . . . n to generate subtag training sets $S_a, S_b, S_c, \ldots S_n$. Each subtag training set includes a plurality of videos, the features of which are used for training the associated subtag. In one embodiment, the positive subtag training sets are initialized using cowatch information to create clusters $C1_a$-$C1_n$, where each cluster $C1_i$ is associated with a latent subtag $S_i$. The clustered videos are then used to initialize positive subtag training sets (i.e. $S_{a\_pos}$ is derived from $C1_a$). The initial negative training set for the subtag training sets can be randomly chosen from the negative tag trainings set.

Cowatch information is used broadly in this disclosure to include any available information indicating videos together watched by a user in a viewing session or closely together in time. Cowatch information includes co-incidence information, occurrence frequency of videos in the same viewing session, user searching, user page changing, user link accessing, video, user video viewing interactions (stops, fast forward, rewind, etc.) and other user activity. Cowatch information can include videos played immediately before or after a video or within some set time period (e.g. 20 minutes) by the same user. Cowatch information also includes negative interactions—for example a user follows a link to a second video from a first video, and then promptly stops playing the second video.

The cowatch information can be helpful because it is likely to indicate types of videos within a given tag which carry a similar semantic meaning. A user who watches a mountain bike video is more likely to watch a second video relating to mountain biking than a video relating to pocket bikes or road bikes. Though subtag labels are not necessarily associated with semantic differences for videos, by initializing subtag membership according to cowatch data, the initial data set is likely to contain semantically different videos.

An embodiment of the subtag initialization process using clustering of the cowatch data as now described. From among the positive tag training set for a given tag, a random sample of videos is selected, N. This could be a percentage portion of the training set or a specific number of videos, such as 3000. A cowatch video list $L_i$ is generated for each sampled video $V_i$, i.e. $L_1, L_2 \ldots L_n$. A unified list of cowatched videos is created, L, which comprises the union of the video cowatch lists, i.e., $L=\{L_1 \cup L_2 \cup \ldots L_n\}$. Note that membership in the cowatch video lists is not limited to the N randomly sampled videos, but rather includes any video co-watched with the videos N. As such, L contains every video co-watched with any video in N.

Next, a vector for each sampled video is created, $V_1, V_2, \ldots V_m$ which represent which of the members of L are cowatched with $V_i$. To accomplish this, the vector lengths are set equal to the unified video cowatch list length: $|V|=|L|$. Each element in the vector is used to represent the corresponding video in L. For example, the $5^{th}$ element in each vector $V_1, V_2, \ldots V_n$, represents the $5^{th}$ video in L. For each vector $V_i$, the element is to 0 or 1 according to whether the indexed video is in that video $V_i$'s cowatch list. For example, the $5^{th}$ element of $V_1$ is set to 1 if the video identified at position 5 in L is a member of $L_1$. In this way, a set of vectors $\{V_1\text{-}V_n\}$ is created which quantifies the cowatched videos.

Next, the videos are clustered using the set of cowatch vectors $\{V_1\text{-}V_n\}$. In this way, the videos can be grouped according to commonly cowatched videos. In one embodiment the clustering is accomplished by using k-means clustering. The distance between these vectors can be computed with the $L_1$ distance as is known in the art, or other distance metrics. The number of clusters used in the k-means clustering is not fixed, but can be chosen by the system designer to best represent the number of subtags expected in the video sampling, or a static value is used, such as 5. For example, if the number of randomly sampled videos increases, the system can increase the number of clusters used.

After determining the clusters, any clusters which appear to be outliers are removed. For example, the clusters with too few samples can be excluded or merged into the nearest cluster. Each video V, is now associated with a cluster C1. The number of remaining clusters is the number of latent subtags used for training subtag classifiers. Each cluster C1 can now be used to initialize the subtag positive training sets. That is, $C1_a$ can initialize the positive training set $S_{a\,pos}$, $C1_b$ initializes the positive training set $S_{b\,pos}$, etc.

To initialize the positive training set $S_n$, the cowatched video list L for each video belonging to the cluster $C1_n$ is added to $S_{n\,pos}$. For example, if $C1_a$ includes videos 3, 5, and 6, $S_{a\,pos}$ is constructed with the union of the cowatched lists: $S_{a\,pos} = \{L_3 \cup L_5 \cup L_6\}$. In an embodiment, videos are not added to the subtag training set until they appear a threshold number of times in the cowatch lists. This threshold approach removes cowatch videos which appear tangential to the other videos in the cowatch cluster, and therefore are less likely to be representative of the latent subtag. As described above, the initial subtag negative training sets can be comprised of randomly sampled videos from the tag negative training set. The initial subtag training set is simply the union of the positive and negative subtag training sets: $S_a = (S_a\,pos \cup S_{a\,neg})$. Subtag classifiers $C_a\text{-}C_n$ can now be trained on the respective training sets $S_a\text{-}S_n$.

Since the generation of subtags in this embodiment is completed by automatically processing cowatch data, this process is unsupervised and does not require any management by the system administrator. In addition, the resulting subtag classifiers are trained on features extracted from videos which have a cowatched relationship to one another, which makes it more likely the subtag classifiers derived from this method also relate to a latent semantic difference between videos.

In the foregoing, cowatch information is used to identify subtag clusters for initial subtag training sets. In addition, other embodiments may identify initial subtag training sets by other means, such as by manual identification of semantically meaningful subtags or by clustering according to video features. Now that the subtag training sets have been initialized, an iterative approach is used to further refine the subtag classifiers as described below.

Subtag Classifier Training Overview

Figure 3:
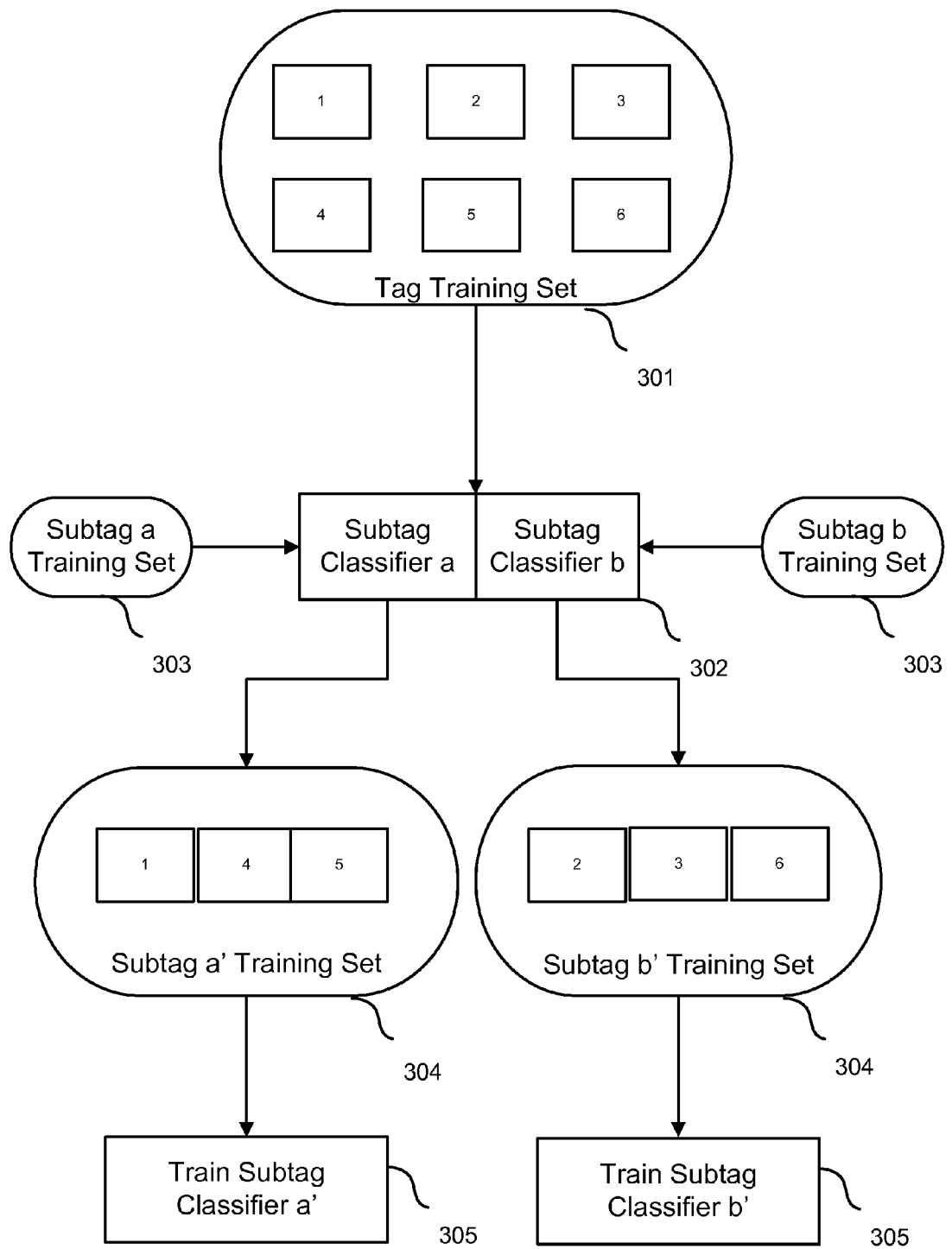
FIG. 3 presents an overview of video classification by subtag and iterative subtag learning according to an embodiment.

Referring now to FIG. 3, an overview of a subtag classifier training approach according to an embodiment is provided. The subtag classifier training approach trains the subtag classifier and the tag classifiers jointly. Since the videos in the training set 301 are identified as positives or negatives on the tag level (as described above relative to the video metadata), the system does not a priori have any determination of which subtag classifier 302 to train on a given video. In order to determine which subtag classifier to train on a given video, an alternating approach is applied. Initially, the current iteration of subtag classifiers is applied to the videos to determine the "best fit" subtag for each video. Then, the "best fit" videos for each subtag are used to iteratively refine the subtag classifier. The next iteration begins by determining the "best fit" for the videos using the refined subtag classifiers. This conceptual framework is illustrated in FIG. 3.

The training set 301 includes videos 1-6 which do not a priori have any subtag designation. In this simplified model with two subtags, the subtag classifiers $C_a$ and $C_b$ 302 have been trained by features extracted from the subtag training sets $S_a$ and $S_b$ 303. In the first iteration, $S_a$ and $S_b$ are the initial training sets determined by the cowatch initialization process above. The tag training set 301 is assessed by the subtag training sets $S_a$ and $S_b$ 303 and used to determine the latent subtags in the training set 301. That is, each video is placed in the subtag training set 304 belonging to the subtag classifier which resulted in the highest confidence score. An alternate explanation is that extracted features of a video are now used to determine which subtag cluster of features the video is most similar to. In this example, the features extracted from videos 1, 4, and 5 were determined as more closely fitting $C_a$, and these videos were placed in $S_{a'}$, for training $C_{a'}$. Likewise, the features extracted from videos 2, 3, and 6 indicated these videos more closely fit $C_b$ and were placed in the training set $S_{b'}$, for training $C_{b'}$. The next iteration of subtag classifiers $C_{a'}$, and $C_{b'}$, 305 are then trained on each respective subtag training set $S_{a'}$ and $S_{b'}$, 304. This provides the conceptual framework for the iterative subtag classifier training which is further explored in FIG. 4.

To overview, in this embodiment, training of the classifier for the tag (which is comprised of a set of subtag classifiers) proceeds with two main steps. First, the current classifier model is used to determine the "best fit" subtag group for each video in the training set. Second, the features extracted from the videos in each subtag group are used to retrain the subtag classifiers.

One effect of this training process is that the "best fit" subtag group for a particular video may change from one iteration to another. For example, this results if the video's features score only marginally better for one subtag relative to another, and because the next iteration changes the composition of videos (and hence features training the classifiers) in the subtag training set, the video's features score higher in another subtag group on the next iteration.

Iterative Development of Subtag Classifiers

Figure 4:
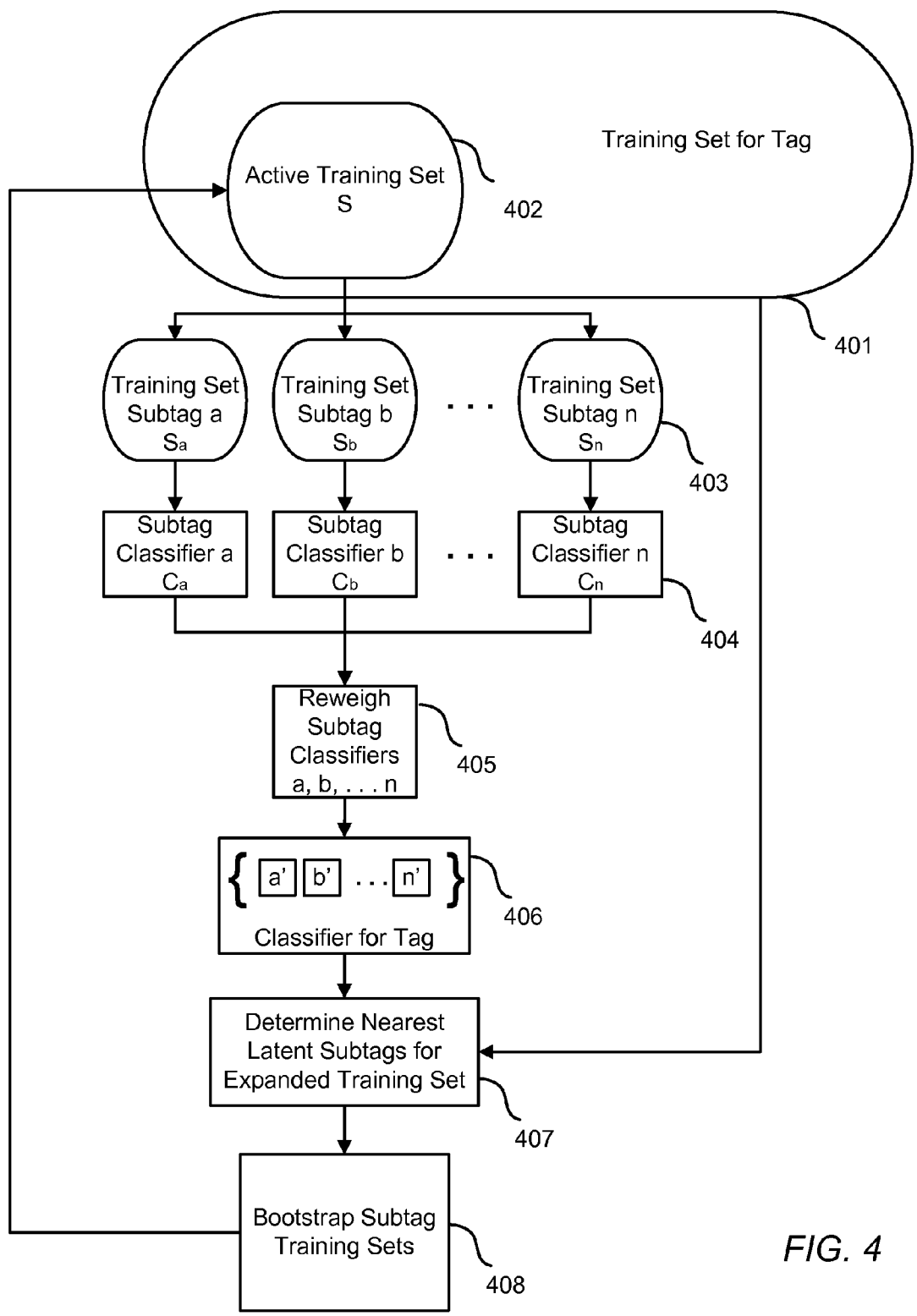
FIG. 4 is a detailed data flow diagram depicting the iterative learning of a tag and subtag classifiers according to an embodiment.

An embodiment of a method for iteratively training subtag classifiers is shown by the data flow diagram in FIG. 4. The training set for the tag 401 includes the videos selected for training the tag classifier identified by the partitioning module 235. These videos can be further segregated into portions for use during iterative training as desired. The videos currently being used for training the subtag classifiers is the active training set S 402. In one embodiment, each video in the training set 401 is also a video in S. In the embodiment described below, the active training set S 402 is a selected portion of the entire training set 401.

The active training set S 402 comprises subtag training sets $S_a\text{-}S_n$ 403. On the first iteration, the subtag training sets $S_a\text{-}S_n$ 403 are initialized, such as by cowatch data.

Thus, the active training set 402 comprises a plurality of subtag training sets 403, one for each subtag. That is, the videos in the active training set 402 are designated for a subtag training set, according to the subtag training sets 403. The subtag training sets 403, $S_a\text{-}S_n$, are used to train associated subtag classifiers 404 $C_a$-$C_n$. Each of the subtag classifiers 404 $C_a$-$C_n$ are used to classify features for a latent subtag of the tag, and together comprise a classifier for the tag itself.

Since the subtag classifiers are each trained on different data sets and may not have converged in confidence scores, the subtag classifiers are reweighed 405. In particular, the subtag classifiers may not have converged due to the feature selection from the videos and the number of stumps used for the subtag classifiers. Using this approach, the confidence scores from the different classifiers are compared to determine the latent subtags, as initially described above with reference to FIG. 3. In one embodiment, a linear SVM is used to calibrate the decision scores for each classifier. This is used to reweigh each classifier based on its discriminative ability over the tag. One method for reweighing the subtag classifiers is to train the linear SVM using each subtag classifier over all training videos using the videos' associated membership in the tag. After reweighing, the tag classifier 406 comprises a set of subtag classifiers $C_{a'}$-$C_{n'}$ corresponding to the subtag classifiers 404 modified by each subtag classifier's associated weighing factor. The process can be stopped here and tag classifier 406 can be used for classifying extracted video features according to tag classifier 406.

Alternatively, an iterative approach to improving the classification can proceed. After a desired number of iterations, the final classifier for the tag can also be chosen as tag classifier 406.

The first iterative step is to determine the nearest latent subtags for the training set 407. The features extracted from the videos in training set 401 are analyzed by the subtag classifiers 404 (modified by the reweighing) to determine the most likely ("nearest") latent subtag for each video in the training set 401. Each video in the training set 401 is then added to the subtag training set 403 corresponding to the identified latent subtag.

This iterative approach follows the conceptual framework of FIG. 3. That is, the features from the videos in the training set are used to find the "best fit" (i.e. highest-confidence) subtag classifier for each video. Then, each video is added to the subtag training set for its "best fit" subtag classifier. As an example, the subtag training set $S_a$ is expanded to include the videos in the training set 401 whose features were best characterized by $C_{a'}$, compared to $C_{b'}$-$C_{n'}$. Since the training set 401 includes positive as well as negative training videos, each subtag training set 403 is expanded to include the positive and negative samples which most closely match its subtag classifier 405.

An additional bootstrapping step 408 used in one embodiment to bootstrap the subtag training sets is described below. After expanding the subtag training set with the videos identified as corresponding to each latent subtag and optionally performing bootstrapping, the expanded subtag training sets are used as the active training set 502 for the next training iteration. In one embodiment, the subtag training sets 403 are reset after the subtag classifiers 404 are created, such that the next iteration of the subtag training sets 403 includes only the videos which are identified as closest matches for the subtags. If desired, after a set number of iterations or after convergence for the classifier 406, the tag training set 401 is expanded to include further videos if the partitioning module 235 has included several partitions for further training iterations.

Subtag Training Set Bootstrapping

The bootstrapping used at block 408 can be used to modify the subtag training set prior to retraining the subtag classifiers 405 by selecting videos for inclusion in the active training set 402. Since the tags may be identified from user-provided metadata, the tags provided by users may be "noisy" and occasionally unreliable. As a result, it is desirable not to include the videos which, while marked by users as positives for the tag may not have features which resemble other videos with the tag. This makes it less likely the video is an actual positive. Thus it is useful to reduce the positive training set for each subtag to include only the "trustworthy" positives. Further, the negative training set for the subtags may comprise a very large number of negatives for the tag, with many negatives sharing very few feature commonality with the subtag. As such, the negative training set could be improved by including primarily the negative videos which are "confusing"—that is, most similar to the features representative of the subtag. The bootstrapping at block 408 is used to select the active training set 402 according to these concepts.

One method of reducing the "untrustworthy" positives is to update the subtag training sets by including k samples which provided the highest confidence decision scores according to the applicable subtag classifier. Stated another way, the positives which belong to that subtag but which provide the lowest confidence according to the subtag classifier are excluded from the training set for the next iteration of training the subtag label, because the tag, while providing a "positive" may be an "untrustworthy" positive given user-provided data entry.

Likewise, when constructing the negative training set for the subtag, the negative videos included in the training set are those which provide the highest confidence as a positive by the subtag classifier. That is, the k most "confusing" or "hardest" negatives (which are most likely to provide false positives to the classifier training) can be included in the negative trainings set for each subtag. The training set size determined by k can be tuned according to the ability of the subtag classifier training to maintain the videos in memory. As a result of this bootstrapping, the subtag classifiers are trained on a "clean" dataset, which contains the most "trustworthy" positive samples, and may be more tolerant to label noise by users. The k positive samples need not be the same as the k negative samples. In some embodiments, as the process iteratively refines the classifiers, the size of the active training set (that is, the training set size k) is increased.

Identification of Video Tags Using Subtag Classifiers

Figure 5:
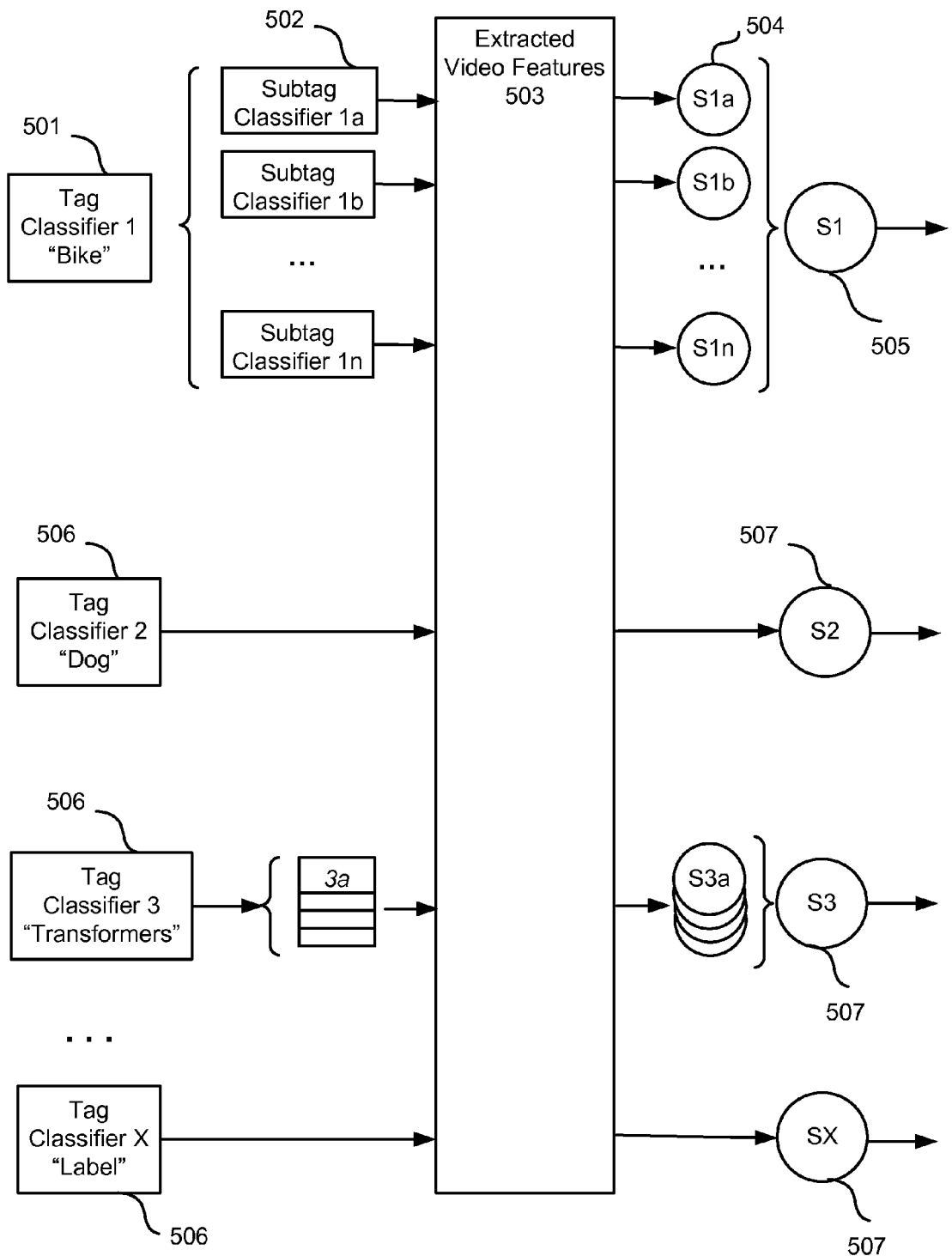
FIG. 5 is a data flow diagram representing an application of a tag learning module utilizing subtag classifiers according to an embodiment.

A system for applying tags to videos using tag classifiers utilizing subtag classifier components is now described with reference to an embodiment in FIG. 5. The tag classifier 501 as shown is comprised of a plurality of subtag classifiers 502 $C_{1a}$-$C_{1n}$. Association with the tag "Bike" is determined by Classifier 501 $C_1$, which is assessed by the set of subtag classifiers 502. The subtag classifiers 502 are trained according to the techniques described above. This figure illustrates assessing likely tags for a video using extracted video features 503.

In assessing the extracted video features 503 for membership in the tag 501, the video is classified by the subtag classifiers 502 to determine classification scores 504. Score $S_{1a}$ is the score produced by $C_{1a}$ when provided the extracted video features 503 as an input. Further scores 504 are produced by subtag classifiers as $S_{1a}$-$S_{1n}$. To determine the final score 505 $S_1$ for the tag classifier 501, the subtag classifier scores $S_{1a}$-$S_{1n}$ are adjusted using the reweighing adjustment, and the maximum score is selected as the classifier score 505 S1. The maximum score 505 is used to determine membership in the tag "Bike."

Additional classifiers 506 may also be used to determine scores 507 relating to the labels associated with these classifiers. As shown with C3 relating to "transformers," other tag classifiers also comprise a group of subtag classifiers, while further tag classifiers, such as C2 relating to "dog" do not.

Using the scores $S_1$-$S_x$, the system can assess the likelihood the labels associated with the tags accurately characterize the features extracted from the video.

SUMMARY

Using the concept of a latent subtag within the videos belonging to the tag in the training set, the identification of a tag using a plurality of subtag classifiers is improved. The initialization of the subtag training sets can be performed by a variety of methods, such as initialization by cowatch features. By refining the training sets for each subtag to exclude the outlying positive videos and to include the most "confusing" negative videos, the subtag classifiers can be trained to improve robustness of the subtag training sets.

Applications of Tag Learning with Subtag Classifiers

The above-described process, and the classifiers obtained therefrom, have a number of valuable applications.

1) Tag Labeling of Videos: As one example, the process can be used to add tag labels to videos. In one embodiment, for each classifier 214 whose resulting score indicates that the video 117 represents the associated tag 211, the corresponding tag label 211A is added to the metadata of the video. In an alternative embodiment, the scores are sorted, and only the labels 211A corresponding to the top N tags 211 are added to the video metadata. In another alternative embodiment, only those scores indicating a particularly strong match—i.e., only those scores above some particularly threshold—are added.

2) Subtag Labeling of Videos: Though the subtag classifiers have never assumed a semantic meaning to derive from the features associated with the subtag classifiers, it is possible to develop semantic meanings for some subtags. The subtag training sets comprise videos which themselves include descriptive text and other metadata. Using this metadata for the subtag trainings set videos, analysis of the textual information can provide a label for the subtag. Since the subtag was previously developed from latent information, a semantic meaning should only be provided for the videos if adequate certainty is developed for the subtag labels. Therefore, textual information is only treated as a semantically meaningful label if the textual information is present in a supermajority of the subtag videos. If the most frequently textual description in a subtag training set exceeds a threshold for frequency and distribution, it is adopted as the semantic label of the subtag, and membership in the subtag can additionally apply the subtag label to the video metadata. In one embodiment when this technique is used, the subtag label is treated with greater skepticism, and users are prompted to confirm that the subtag label applies.

3) Correction of Video Descriptions Based on Tag Identification: As another use of the trained subtag classifiers, existing user-supplied textual metadata can be tested and—if found to be inaccurate—modified. This is of particular use for identifying and fixing "spam" video descriptions, where the user submitting the video intentionally provided a misleading description. More specifically, the user-supplied textual metadata for a video 117 is obtained. If the textual metadata or user-supplied tags includes a tag label 211A for which a classifier 214 has been learned, the classifier is applied to the video, thereby producing a score. If the score indicates that the video does not represent the associated tag—e.g., the score is below some minimum threshold—then a remedial action can be taken, such as flagging the video, removing the associated text from the user-supplied metadata, and the like. In particular, this technique is useful to ensure that a particular tag has a specific meaning and thereby trim borderline cases to improve user searching.

While this disclosure relates to methods of identifying tags for use in video, the use of latent subtag classifiers to determine tag membership could be applied to a variety of other classification systems. For example, image classification or sound classification could also benefit from classifications determined based on latent subtag identifiers.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method for learning tags applicable to videos, the method comprising:
   initializing a classifier for a tag derived from textual metadata associated with videos, the classifier comprising a plurality of subtag classifiers, each subtag classifier associated with a latent subtag and configured to classify features extracted from a video as belonging to the associated latent subtag;
   maintaining a training set of videos including a training subset for each latent subtag; and
   iteratively improving the classifier for the tag, by:
      identifying, for each video in the training set, a latent subtag for the video by applying the subtag classifiers to features extracted from the video; and
      retraining each of the plurality of subtag classifiers using at least a portion of the videos in the subset identified as belonging to that latent subtag.

2. The computer-implemented method for improving learning of a tag of claim 1, wherein membership of videos in the plurality of latent subtags is not derived from the textual metadata.

3. The computer-implemented method for improved learning of a tag applicable to videos of claim 1, wherein the iterative improvement includes modifying the training subset for each latent subtag to include a portion of the subset identified as belonging to that latent subtag.

4. The computer-implemented method of claim 3, wherein the training subset for each latent subtag is trimmed to exclude a portion of the training subset which receives low-confidence scores relative to another high-confidence portion of the training subset.

5. The computer-implemented method of claim 4, wherein the training subset for each latent subtag is trimmed to exclude portions of the training subset which includes low-confidence videos which include the tag.

6. The computer-implemented method of claim 1, further comprising:
   selecting an initial training subset for each of the plurality of latent subtags, the initial training subsets including initial training videos selected based on co-watch data associated with the initial training videos.

7. The computer-implemented method of claim 1, wherein features extracted from the video includes co-watch data features.

8. A computer-implemented method for learning of a tag, the method comprising:
   selecting a tag from metadata of a plurality of videos;
   selecting a portion of the plurality of videos associated with the tag;
   calculating co-watch data from the portion of videos associated with the tag;
   determining, from the co-watch data, a plurality of latent subtags associated with the tag;
   assigning, for each video from the portion of videos, a latent subtag from the plurality of latent subtags to the video using the co-watch data;
   training a plurality of subtag classifiers using the portion of videos assigned to the latent subtags, wherein the videos assigned to each latent subtag comprises a positive training set for the associated subtag classifier; and
   classifying a video as belonging to the tag using the plurality of subtag classifiers.

9. The computer-implemented method for learning of a tag of claim 8, wherein the determining a plurality of latent subtags comprises clustering the videos according to their co-watch data; and assigning a latent subtag to each video comprises assigns a latent subtag according to a cluster associated with the video.

10. The computer-implemented method for improving learning of a tag of claim 9, wherein the clustering comprises determining a number of latent subtags for the tag according to a number of clusters determined within the co-watch data.

11. The computer-implemented method for improving learning of a tag claim 10, wherein the clustering excludes clusters with a size below a threshold from consideration as a latent subtag.

12. The computer-implemented method for improving learning of a tag of claim 8, wherein the method further comprises iteratively training the plurality of subtag classifiers by:
   classifying videos in a second training set using the plurality of subtag classifiers to identify a latent subtag for each video in the second training set; and
   retraining the plurality of subtag classifiers by including in the training set for each subtag classifier the videos in the second training set identified with the latent subtag.

13. The computer-implemented method for improving learning of a tag of claim 12, wherein the steps of iteratively training the plurality of subtag classifiers further includes trimming the training set for each subtag classifier by excluding videos which provide low subtag classifier confidence scores for videos which correspond to the tag and videos which do not correspond to the tag.

14. A computer-implemented method for improving learning of a tag, comprising:
   initializing a plurality of subtag designations for a plurality of items identified as belonging to a tag, such that each item of the plurality of items belongs to a latent subtag;
   training a plurality of subtag classifiers based upon features for the plurality of items, wherein each subtag classifier is trained on the items with a particular latent subtag designation;

iteratively improving the plurality of subtag classifiers by:
identifying, for each item in a training set as belonging to a latent subtag by applying the subtag classifiers to features for the item; and
retraining each of the plurality of subtag classifiers, using at least a portion of the items in the training set identified as belonging to that latent subtag; and
determining tag membership of an item in the corpus according to an output of the plurality of subtag classifiers.

15. The computer-implemented method of claim 14, wherein the initialization of the plurality of subtag designations for the plurality of items is provided by clustering user-interest metadata related to the plurality of items.

16. A non-transitory computer-readable storage medium having executable computer program instructions embodied therein for learning tags applicable to videos, the computer program instructions controlling a computer system to perform a method comprising:
initializing a classifier for a tag derived from textual metadata associated with videos, the classifier comprising a plurality of subtag classifiers, each subtag classifier associated with a latent subtag and configured to classify features extracted from a video as belonging to the associated latent subtag;
maintaining a training set of videos including a training subset for each latent subtag; and
iteratively improving the classifier for the tag, by:
identifying, for each video in the training set, a latent subtag for the video by applying the subtag classifiers to features extracted from the video; and
retraining each of the plurality of subtag classifiers using at least a portion of the videos in the subset identified as belonging to that latent subtag.

17. The non-transitory computer-readable storage medium having executable computer program instructions of claim 16, wherein the membership of videos in the plurality of latent subtags is not derived from the textual metadata.

18. The non-transitory computer-readable storage medium having executable computer program instructions of claim 16, the computer program instructions controlling the computer system to perform a method further comprising:
selecting an initial training set for each of the plurality of latent subtags, the initial training sets including initial training videos based on cowatch data associated with the initial training videos.

19. A computer system for training video tag classifiers, the system comprising:
a computer processor;
a computer-readable storage medium storing data including
a plurality of videos;
metadata associated with the plurality of videos; and
a computer program which when executed by the computer processor performs the steps of:
initializing a classifier for a tag derived from textual metadata associated with the plurality of videos, the classifier comprising a plurality of subtag classifiers for a plurality of latent subtags;
maintaining a training set of videos including a training subset for each latent subtag; and
iteratively improving the classifier for the tag, by:
identifying, for each video in the training set, a latent subtag for the video by applying the subtag classifiers to features extracted from the video; and
retraining each of the plurality of subtag classifiers using at least a portion of the videos in the subset identified as belonging to that latent subtag.

\* \* \* \* \*

UNITED STATES PATENT AND TRADEMARK OFFICE
CERTIFICATE OF CORRECTION

| | | |
|---|---|---|
| PATENT NO. | : 8,930,288 B2 | Page 1 of 1 |
| APPLICATION NO. | : 13/294483 | |
| DATED | : January 6, 2015 | |
| INVENTOR(S) | : George Toderice et al. | |

It is certified that error appears in the above-identified patent and that said Letters Patent is hereby corrected as shown below:

IN THE CLAIMS
Column 16, line 31, delete "assigns" and insert --assigning--.
Column 16, line 39, delete "tag claim 10" and insert --tag of claim 10--.

Signed and Sealed this
Eighth Day of March, 2016

Michelle K. Lee
*Director of the United States Patent and Trademark Office*